United States Patent
Minarik et al.

(10) Patent No.: US 7,332,720 B2
(45) Date of Patent: Feb. 19, 2008

(54) COLD SHIELD FOR CRYOGENIC CAMERA

(75) Inventors: Philip R. Minarik, Schaumburg, IL (US); Sung-Shik Yoo, Palatine, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 935 days.

(21) Appl. No.: 10/683,073

(22) Filed: Oct. 10, 2003

(65) Prior Publication Data

US 2005/0078208 A1 Apr. 14, 2005

(51) Int. Cl.
*G01J 5/02* (2006.01)
(52) U.S. Cl. ...................................................... 250/352
(58) Field of Classification Search ................. 250/352
See application file for complete search history.

(56) References Cited

U.S. PATENT DOCUMENTS

| | | | |
|---|---|---|---|
| 4,672,202 A * | 6/1987 | Crossley et al. ............. | 250/238 |
| 5,075,201 A | 12/1991 | Koh | |
| 5,479,015 A | 12/1995 | Rudman et al. | |
| 5,502,309 A * | 3/1996 | Davis .......................... | 250/353 |
| 5,966,945 A * | 10/1999 | Mengel et al. ................ | 62/51.1 |
| 6,144,031 A * | 11/2000 | Herring et al. .............. | 250/352 |
| 2003/0102435 A1* | 6/2003 | Myers et al. ................ | 250/352 |
| 2004/0238741 A1* | 12/2004 | Gat et al. ................. | 250/338.1 |
| 2006/0082681 A1* | 4/2006 | Minarik et al. ............. | 348/373 |
| 2006/0255275 A1* | 11/2006 | Garman et al. .......... | 250/338.1 |

* cited by examiner

*Primary Examiner*—David Porta
*Assistant Examiner*—Christine Sung
(74) *Attorney, Agent, or Firm*—Stetina Brunda Garred & Brucker

(57) ABSTRACT

A cold shield of a cryogenic camera. The cold shield reflects external thermal radiation away from the cryogenic camera, so as to shield the cryogenic camera in a cryogenic temperature such that no internal thermal radiation will be generated. The cryogenic camera has a lens assembly and a focal plane array. The cold shield has an upper cold shield member for holding the lens assembly and a lower cold shield member for holding the focal plane array. The upper cold shield member fits over the lower cold shield member by contact friction, such that limited translation and rotation of the lower cold shield member relative to the upper cold shield member are allowable. Therefore, the cold shield allows a fine adjustment for aligning the lens assembly to the focal plane array.

30 Claims, 2 Drawing Sheets

COLD SHIELD FOR CRYOGENIC CAMERA

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates in general to a cold shield, and more particularly, to a cold shield for shielding a cryogenic camera and reducing thermal noise of images registered by the cryogenic camera.

Image registration is a fundamental task required in many applications of image processing which involves taking two or more images and aligning them so as to either eliminate differences between them or highlight the salient differences for the purpose of study. To obtain sub-pixel accuracy of the registration, a well registered and stable camera configuration is required. An integrated lens has been used in the single element multiple field cameras. In the integrated lens design, the lens position is constantly referenced to the same mechanical plane referred as a focal plane for minimizing allowable movements critical to maintaining alignment. However, since the focus and alignment of the camera are sensitive to temperature, there is a demand for applying a cryogenic system to the camera to suppress the noise caused by thermal radiation.

In U.S. Pat. No. 5,479,015, a multi-image detector assembly has been disclosed. The multi-image detector assembly allows image detection occurring continuously and simultaneously so as to provide a spatially and temporally correlated set of separate images utilizing a single focal plane. However, the cryogenic application of such multi-image detector assembly was not addressed in this patent.

The cryogenic camera is typically disposed in a cryo-vacuum dewar. For image registration, the cryogenic camera is cooled down to a cryogenic temperature, such that the thermal noise can be effectively reduced, and a higher signal to noise (S/N) ratio can be obtained. A positioning stage is disposed in the cryo-vacuum dewar for adjusting lens positions of the cryogenic camera. The positioning stage comprises several screws allowing the user to adjust the lens position by turning the screws. Calculations are made as to how many screw turns are required for each movement of the lens. Such calculations are done coarsely without any feedback. Sometimes laser is radiated on and reflected from the lens as a reference for determining how much movement of the lens has been made. However, as the positioning stage is not accessible from outside of the dewar, when a new position of the lens is required, the lens and the focal plane array have to be warmed up to room temperature for adjustment of the lens position relative to the focal plane. The warming up procedure involves with many steps such as removing the vacuum, opening the dewar, and re-adjusting the lens position. It then consumes hours in pressurizing, re-evacuating and re-cooling to obtain the desired precision of image detection. Further, as the lens is supported by the positioning stage in a floating manner relative to the focal plane array, misalignment between the lens and the focal plane array occurs every time when the system is warmed up. It is thus very laborious for obtaining the optimal lens positions relative to the focal plane.

It is there a substantially need to provide a cryogenically cooled camera of which the positions of the lens assembly relative to the focal plane array are maintained within a tolerable range even when the temperature is elevated, such that when the camera is warmed, readjustment with desired accuracy can be easily achieved within a short time.

BRIEF SUMMARY OF THE INVENTION

The present invention provides a cold shield applied to a cryogenic camera. The cold shield reflects external thermal radiation away from the cryogenic camera, so as to shield the cryogenic camera in a cryogenic temperature such that no internal thermal radiation will be generated. The cryogenic camera comprises a lens assembly and a focal plane array. The cold shield comprises an upper cold shield member for holding the lens assembly and a lower cold shield member for holding the focal plane array. The upper cold shield member fits over the lower cold shield member by contact friction, such that limited translation and rotation of the lower cold shield member relative to the upper cold shield member are allowable. Therefore, the cold shield allows a fine adjustment for aligning the lens assembly to the focal plane array.

The upper cold shield member comprises a lens holder for holding the lens assembly and a holder mount for mounting the lens holder. The holder mount includes at least one bump protruding from an interior sidewall thereof. The bump provides the contact friction to the lower cold shield member fitted within the lens holder. The upper cold shield member further comprises a cap for securing the lens assembly held by the lens holder. Before the cold shield and the cryogenic camera shielded thereby are cooled down to a cryogenic temperature, an adhesive, preferably cryogenically stable adhesive, is applied between the upper and lower cold shield members, such that the relative position of the lens assembly and the focal plane array is fixed. Each of the upper cold shield member and the lower cold shield member includes a window to prevent blocking propagation of an imaging light.

In one embodiment of the present invention, a cold shield is provided and comprises a lower cold shield and an upper cold shield member. The lower cold shield member comprises a lower hollow cylinder with a front end covered by a plate and a rear open end terminated with a flange, and a mounting plate for connecting the rear open end. The upper cold shield member comprises an upper hollow cylinder with a front end covered by a plate and a rear open end terminated with a flange, a lens holder with a rear end mounted to a front surface of the plate and a front open end, and a cap attached to the open end. The lower hollow cylinder is configured for receiving a focal plane array of a camera, while the lens holder is configured to receive a lens assembly of the camera. The plates of the upper and lower hollow cylinders, the cap and the rear end of the lens holder each is perforated with windows allowing imaging light to propagate through.

The lower hollow cylinder has an outer diameter smaller than an inner diameter of the upper hollow cylinder. Preferably, the difference between the outer diameter and the inner diameter is about 0.005 inches. Therefore, the lower hollow cylinder can be inserted into the upper hollow cylinder with a gap therebetween. The upper hollow cylinder further comprises a plurality of bumps protruding inwardly from an interior sidewall to provide frictions contact to the lower hollow cylinder inserted therein. In this manner, the lower cold shield member can be translated and rotated within the upper cold shield member. Consequently, the lens assembly held by the upper cold shield member can be translated and rotated relative to the focal plane array retained in the lower cold shield member. Therefore, a fine focus adjustment and alignment between the lens assembly and the focal plane array can be performed.

The present invention further comprises a cryogenic camera system which comprises a camera and a cold shield. The camera comprises a lens assembly and a focal plane array. The cold shield comprises an upper cold shield member for holding the lens assembly and a lower cold shield member for holding the focal plane array. The upper cold shield member fits over the lower cold shield member in a manner that the lower cold shield member is operative to translate and rotate within the upper cold shield member. Before the cryogenic camera system is cooled down to a cryogenic temperature, a cryogenically stable adhesive is applied between the upper and lower cold shield members to fix the relative position between the lens assembly and the focal plane array. The camera further may comprises a filter installed in the cold shield between the lens and the focal plane, and a readout integrated circuit installed in the lower cold shield member.

DETAILED DESCRIPTION OF THE INVENTION

Figure 1:
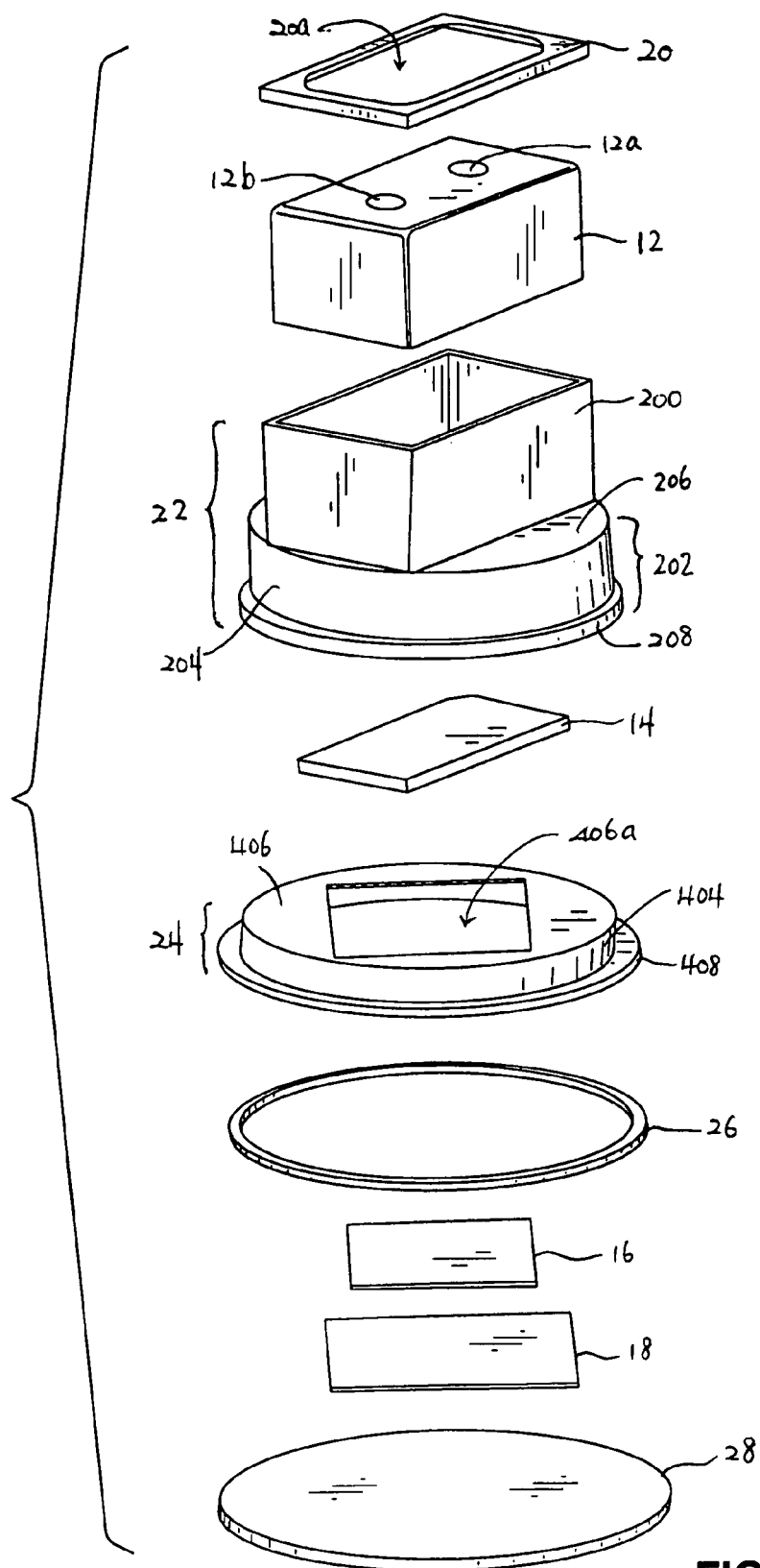
FIG. 1 is an exploded view showing a cold shield provided by the present invention applied to a camera.

As shown in FIG. 1, a cryogenic camera, including a multiple-element lens assembly 12, a filter 14, a focal plane array 16 and a readout integrated circuit 18, is shielded by a cold shield. In this embodiment, a standard cryogenically cooled infrared (IR) optical system is used. It is appreciated that the application of the cold shield can be expanded to any optical system for image registration without exceeding the spirit and scope of the present invention. Both the cryogenic camera and the cold shield shielding are disposed in a cryo-vacuum dewar and cooled to cryogenic temperatures. In such way, external radiation can be reflected by the cold shield, while the elements of the camera, including the multiple-element lens assembly 12, the filter 14, the focal plane array 16 and the readout integrated circuit 18, are cooled down to a temperature so low that no radiation is emitted to cause thermal noise. In practical application, the multiple-element lens assembly 12 is disposed on a manipulation stage, such that translation and/or rotation of the multiple-element lens assembly 12 relative to the focal plane array 16 can be performed for alignment.

The cold shield includes a cap 20, an upper cold shield member 22, a lower cold shield member 24, a mounting ring 26, and a mounting plate 28. The upper cold shield member 22 includes a lens holder 200 for holding the multiple-element lens assembly 12 therein and a holder mount 202 on which the lens holder 200 is supported. In this embodiment, the multiple-element lens assembly 12 includes two focusing members and a housing of the focusing members configured into a cuboid. Apertures 12a and 12b of the focusing members are formed through the housing of the multiple-element lens assembly 12. The holder 200 includes a cuboid box with a size slightly larger than the housing of the multiple-element lens assembly 12. As shown, the holder 200 has a rectangular opening from which the multiple-element lens assembly 12 is disposed in the holder 200. When the multiple-element lens assembly 12 is disposed in the holder 200, the cap 20 is then adhered to the holder 200 to secure the multiple-element lens assembly 12 in the holder 200. To prevent from blocking imaging light incident onto the focusing members, the cap 20 includes a window 20a which exposes apertures 12a and 12b of both the focusing members. It is appreciated that the shapes and dimensions of the cap 20, the window 20a and the holder 200 can be altered according to the specific shapes and dimensions of the multiple-element lens assembly 20 as well as the number and arrangement of the focusing members thereof.

The upper cold shield member 22 further comprises a holder mount 202 for mounting and supporting the holder 200. As shown in FIG. 1, the holder mount 202 includes a hollow cylinder 204 with one end covered by a plate 206 and the other end terminated with a flange 208. The plate 206 serves as a platform on which the lens holder 200 is mounted and supported. Preferably, the holder 200 and the holder mount 202 are formed integrally with each other; or alternatively, the holder 200 and the holder mount 202 can be formed in separate pieces combined together by cryogenically stable adhesive or mechanical fastening structure such as latches, screws, bolts or the like. The bottom surface of the lens holder 200 and the plate 206 are perforated with windows 200a and 206a (FIGS. 2 and 3) allowing light focused by the multiple-element lens assembly 12 to propagate through. In the embodiment as shown in FIG. 1, the filter 14 is directly attached to the holder mount 202 at the side opposite to the holder 200 to minimize the size of the cold shield and the adverse effect of movement. It will be appreciated that the filter 14 can be disposed anywhere between the multiple-element lens assembly 12 and the focal plane array 18. Alternatively, other structure such as filter holder can also be formed as a part of the upper or lower cold shield members 22 and 24 for retaining the filter 14 therein.

Figure 2:
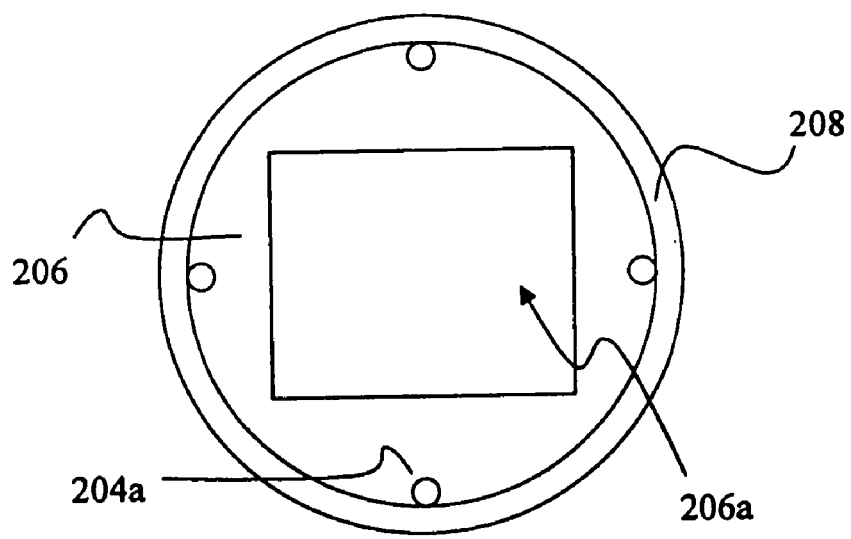
FIG. 2 shows a rear view of an upper cold shield member of the cold shield as shown in FIG. 1.
Figure 3:
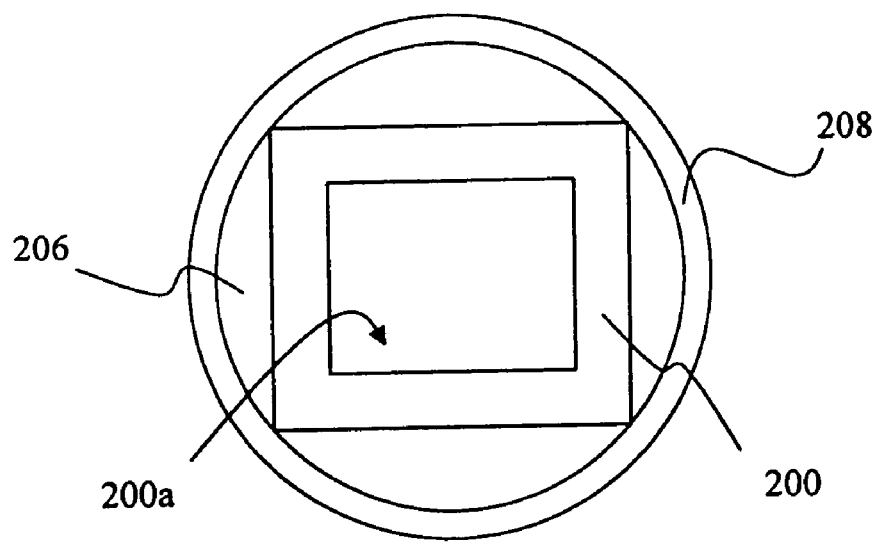
FIG. 3 shows a front view of the upper cold shield member.

FIG. 2 shows a rear view of the holder mount 202. A shown in FIG. 2, friction bumps 204 are formed on the interior side wall of the cylinder 204 to provide friction contact to the lower cold shield member 24. As shown, the plate 206 is perforated with the window 206a to avoid blocking propagation of the imaging light focused by the multiple-element lens assembly 12. Similarly, as shown as the front view of the upper cold shield member 22 in FIG. 3, the window 200a perforating through the bottom surface of the lens holder 200 provides the path for propagation of the imaging light.

The lower cold shield member 24 includes a hollow cylinder 404 with one end covered by a plate 406 and the other end terminated with a flange 408. To prevent from blocking the imaging light propagating from the multiple-element lens assembly 12, the plate 406 is perforated with a window 406a. The lower cold shield member 24 further comprises a mounting ring 26 glued with the flange 408 by cryogenic stable adhesive such as Dow-Corning 93500. When the focal plane array 16 and the readout integrated circuit 18 are disposed in the lower cold shield member 24, the lower cold shield member 24 glued with the mounting ring 26 are then mounted to the mounting plate 28. The focal plane array 16 and the readout integrated circuit 18 are thus secured in the lower cold shield member 24.

Preferably, the hollow cylinder 404 has an outer diameter slightly smaller than the inner diameter of the cylinder 204 of the upper cold shield member 22, such that the lower cold shield member 22 can be inserted into the upper cold shield member 24. Preferably, the difference of diameters between the cylinders 404 and 204 is about 0.005 inches. Therefore, when the lower cold shield member 24 is inserted into the upper cold shield member 22, a gap of is formed between the upper and lower cold shield members 22 and 24. The gap is properly sized for wicking the adhesive thereinAs shown in FIG. 2, the bumps 204a protruding radially inwards from the interior wall of the cylinder 204 provides friction contacts to the lower cold shield member 24 inserted into the upper cold shield member 22. As the upper and lower cold shield members 22 and 24 are engaged with each other by the contact friction provided by the bumps 204a only, limited translation and rotation of the lower cold shield member 24 within the upper cold shield member 22 are allowed. That is, the lower cold shield member 24 can be pushed further into the upper cold shield member 22 until the flange 408 of the lower cold shield member 24 is in contact with the flange 208 of the upper cold shield. In contrast, the cold shield member 24 can also be pulled in an opposite direction to leave a space between the plates 206 and 406. The push and pull movement of the lower cold shield member 24 relative to the upper cold shield member provides a fine adjustment for focusing. Further, as the lower and upper cold shield members 22 and 24 are engaged with other by friction provided by the bumps 204a, the lower cold shield member 24 can be rotated relative to the upper cold shield member 22. The rotation of the lower cold shield member 24 refines alignment of the imaging lights focused by different focusing members of the multiple-element lens assembly.

When the multiple-element lens assembly 12, the filter 14, the focal plane array 16 and the readout integrated circuit 18 are positioned and held within the upper and lower cold shield members 22 and 24, an adhesive such as epoxy is injected into the gap between the upper and lower cold shield members 22 and 24, such that the position of the multiple-element lens assembly 12 relative to the upper and lower cold shield members 22 and 24, as well as the focal plane array 16 are fixed. As the adhesive holds the upper and lower cold shield members 22 and 24 together, the positioning stage for adjusting position of the multiple-element lens assembly 12 can be removed, while the multiple-element lens assembly 12 is properly supported and mounted to the focal plane array 16.

Electroformed copper is preferably, but optionally used for forming the above elements, including the cap 20, the upper cold shield member 22, the lower cold shield member 24, and the mounting plate 28 of the cold shield. The thickness of each of the above elements is no larger than 0.001 inches. The outer surface of each of the above elements is plated with gold to obtain solderability and reflectivity, so as to reject thermal noise. The lens of the multiple-element lens assembly 12 and the filter 14 can be made of materials to transmit infrared red energies, such as silicon, germanium, and zinc selenide (ZnSe). Preferably, the front of the lens is plated with a reflective material such as aluminum to facilitate light rejection of the cold shield. The mounting ring 26 and the readout integrated circuit 18 are preferably ceramic components for electrical connection.

As mentioned above, after the upper cold shield member 22 fits over the lower cold shield member 24, an adhesive is injected for fixing the relative positions between the upper and lower cold shield members 22 and 24. However, when the system is warmed up to a predetermined temperature, thermal expansion of the adhesive as well as every element of the system is introduced by the elevated temperature to cause relative movement between the lens assembly 12 and the focal plane array 16. The primary movement of the lens assembly 12 includes stretching the lens assembly 12 away from the focal plane array 16 to consequently cause defocusing. Other movement includes rotation which arises from thermal expansion differential between various positions. More importantly, as the refractive index of the material of the lens assembly 12 is a function of temperature. Without the movement of the lens assembly 12, the elevated temperature itself will cause change in focal length of the lens assembly 12. On the other hand, though the adhesive is thermally expanded, the upper and lower cold shield members 22 and 24 are still adhered to each other. Therefore, no major tuning or adjustment of the lens assembly 12 is required. However, as the adhesive is thermally expanded, the lower cold shield member 22 is allowed to rotate and translate within the upper cold shield member to refining the alignment before the system is cooled down again.

This disclosure provides exemplary embodiments of cold shield for a cryogenic camera. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A cold shield for shielding a cryogenic camera including a lens assembly and a focal plane array, the cold shield comprising:
    an upper cold shield member for holding the lens assembly;
    a lower cold shield member for holding the focal plane array, wherein the upper cold shield member fits over the lower cold shield member, the upper and lower cold shield members, during assembly, being temporarily held together by contact friction which allows limited translation and rotation of the lower cold shield member within the upper cold shield member to enable alignment between the lens assembly and the focal plane array; and
    a cryogenically stable adhesive holding the upper and lower shield members in fixed engagement.

2. The cold shield of claim 1, wherein the upper cold shield member includes a lens holder for holding the lens assembly therein and a holder mount for mounting the lens holder thereon.

3. The cold shield of claim 2, wherein the holder mount includes at least one bump protruding from an interior sidewall thereof.

4. The cold shield of claim 3, wherein the bump is configured to provide the contact force between the upper cold shield member and the lower cold shield member.

5. The cold shield of claim 1, further comprising a cap adhered to the upper cold shield member for securing the lens assembly in the upper cold shield member.

6. The cold shield of claim 1, further comprising a mounting ring adhered to the lower cold shield and a mounting plate for mounting the lower cold shield and the mounting ring thereon, such that the focal plane array is secured in the lower cold shield member.

7. The cold shield of claim 1, wherein the upper and lower cold shield members each comprises a window allowing imaging light incident onto the lens assembly held in the upper cold shield member to propagate towards the focal plane array held in the lower cold shield member.

8. A cold shield, comprising:
a lower cold shield member being coolable to a cryogenic temperature, comprising:
a lower hollow cylinder with a front end covered by a plate and a rear open end terminated with a flange; and
a mounting plate for connecting the rear open end of the hollow cylinder; an tipper cold shield member being coolable to a cryogenic temperature, comprising:
an upper hollow cylinder with a front end covered by a plate and a rear open end terminated with a flange, the upper hollow cylinder being configured to fit over the lower hollow cylinder;
a lens holder with a rear end mounted to a front surface of the plate and a front open end; and
a cap attached to the open end of the lens holder; and
a cryogenically stable adhesive holding the upper and lower shield members in fixed engagement.

9. The cold shield of claim 8, wherein the lower hollow cylinder is configured for receiving a focal plane array of a camera therein.

10. The cold shield of claim 9, wherein the lens holder is configured to receive a lens assembly of a camera therein.

11. The cold shield of claim 8, wherein the plate of the lower hollow cylinder, the plate of the upper hollow cylinder, the rear end of the lens holder and the cap each is perforated with a window.

12. The cold shield of claim 8, wherein the lower hollow cylinder has an outer diameter smaller than an inner diameter of the upper hollow cylinder.

13. The cold shield of claim 12, wherein the upper hollow cylinder further comprises at least one bump protruding inwardly from an interior sidewall thereof.

14. The cold shield of claim 13, wherein the lower hollow cylinder is frictionally engaged with the upper hollow cylinder by the bump.

15. The cold shield of claim 8, wherein the outer diameter of the lower hollow cylinder is 0.005 inches smaller than an inner diameter of the upper hollow cylinder.

16. The cold shield of claim 8, wherein the upper and lower cold shield members are made of electroformed cupper.

17. The cold shield of claim 8, wherein the upper and lower cold shield members each has a thickness less than 0.001 inches.

18. The cold shield of claim 8, wherein the upper and lower cold shield members are coated with gold.

19. The cold shield of claim 8, wherein the lower cold shield member further comprises a mounting ring as an interface to interconnect the lower hollow cylinder and the mounting plate.

20. The cold shield of claim 19, wherein the mounting ring is made of ceramic material.

21. A cryogenic camera system, comprising:
a camera, comprising a lens assembly and a focal plane array; and
a cold shield, comprising:
a lower cold shield member for holding the focal plane array therein;
an upper cold shield member for holding the lens assembly therein, wherein the upper cold shield member fits over the lower cold shield member in a manner that the lower cold shield member is operative to temporarily translate and rotate within the upper cold shield member, and
a cryogenically stable adhesive holding the upper and lower cold shield members together.

22. The cryogenic camera system of claim 21, wherein the camera further comprises a filter installed in the cold shield between the lens assembly and the focal plane array.

23. The cryogenic camera system of claim 21, wherein the camera further comprises a readout integrated circuit installed in the lower cold shield member.

24. The cryogenic camera system of claim 21 wherein the lens assembly is alignable with imaging lights by rotation of the upper cold shield member relative to the lower cold shield member.

25. The cold shield of claim 24, wherein the upper cold shield member includes a lens holder for holding the lens assembly therein and a holder mount for mounting the lens holder thereon.

26. The cold shield of claim 25, wherein the holder mount includes at least one bump protruding from an interior sidewall thereof.

27. The cold shield of claim 26, wherein the bump is configured to provide the contact force between the upper cold shield member and the lower cold shield member.

28. The cold shield of claim 24, further comprising a cap adhered to the upper cold shield member for securing the lens assembly in the upper cold shield member.

29. The cold shield of claim 24, further comprising a mounting ring adhered to the lower cold shield and a mounting plate for mounting the lower cold shield and the mounting ring thereon, such that the focal plane array is secured in the lower cold shield member.

30. The cold shield of claim 24, wherein the upper and lower cold shield members each comprise a window allowing imaging light incident onto the lens assembly held in the upper cold shield member to propagate towards the focal plane array held in the lower cold shield member.

* * * * *